Figure 1:
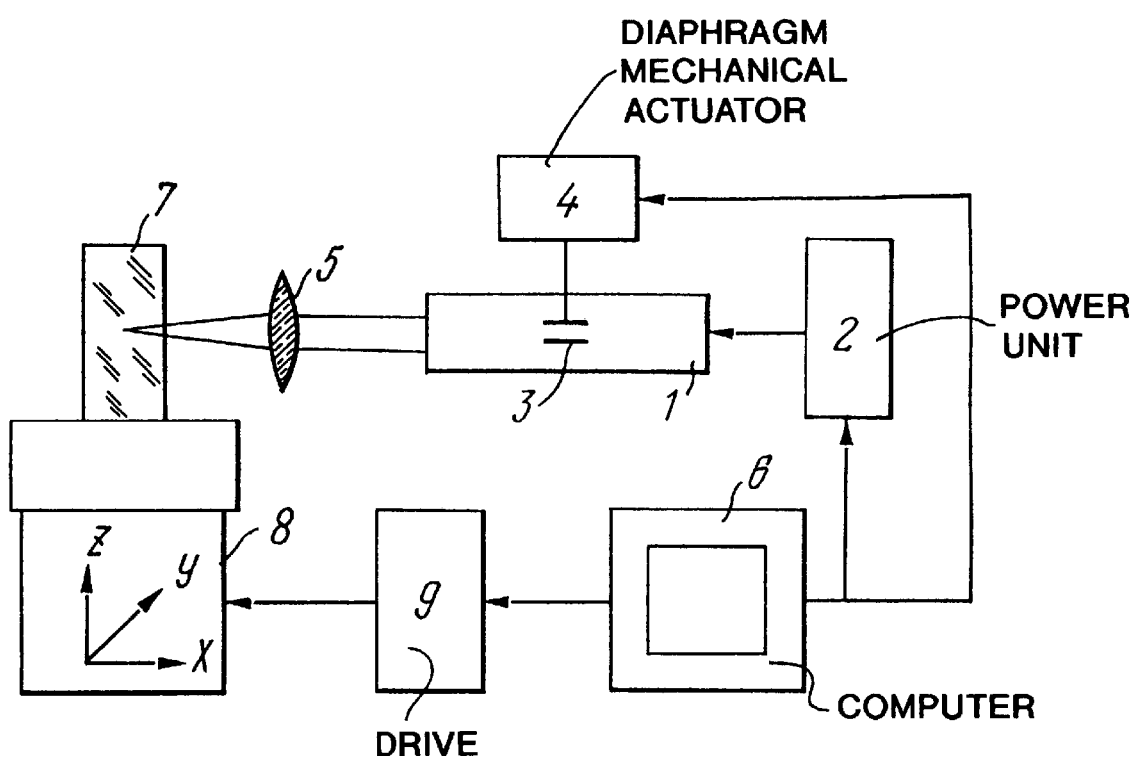

United States Patent [19]
Vasiliev et al.

[11] Patent Number: 5,886,318
[45] Date of Patent: Mar. 23, 1999

[54] METHOD FOR LASER-ASSISTED IMAGE FORMATION IN TRANSPARENT OBJECTS

[76] Inventors: Anatoly Valentinovich Vasiliev, 143400, Moskovskaya obl., Krasnogorsk, ul. Lenina, Russian Federation, d 49 kv 38; Boris Efimovich Goldfarb, 143400 Moskovskaya obl., Krasnogorsk, ul. Kirova, Russian Federation, d 30 kv 18

[21] Appl. No.: 860,482
[22] PCT Filed: Nov. 3, 1995
[86] PCT No.: PCT/RU95/00235
  § 371 Date: Jun. 26, 1997
  § 102(e) Date: Jun. 26, 1997
[87] PCT Pub. No.: WO97/16387
  PCT Pub. Date: May 9, 1997
[51] Int. Cl.$^6$ .................................................. B23K 26/06
[52] U.S. Cl. ................................ 219/121.69; 219/121.73
[58] Field of Search ......................... 219/121.68, 121.69, 219/121.73, 121.75; 372/103, 104

[56] References Cited

U.S. PATENT DOCUMENTS

| | | | |
|---|---|---|---|
| 3,281,712 | 10/1966 | Koester | 219/121.73 |
| 3,286,193 | 11/1966 | Koester et al. | 219/121.73 |
| 3,657,510 | 4/1972 | Rothrock | 372/103 |
| 4,675,500 | 6/1987 | Kunz et al. | 219/121.73 |
| 5,575,936 | 11/1996 | Goldfarb | 219/121.68 |
| 5,637,244 | 6/1997 | Erokhin | 219/121.69 |
| 5,744,780 | 4/1998 | Chang et al. | 219/121.73 |

FOREIGN PATENT DOCUMENTS

| | | |
|---|---|---|
| 233 152 6 | 4/1983 | Germany . |
| 321422 | 1/1972 | U.S.S.R. . |
| 1620428 A1 | 1/1991 | U.S.S.R. . |
| 1818307 A1 | 5/1993 | U.S.S.R. . |
| 2008288 C1 | 2/1994 | U.S.S.R. . |

Primary Examiner—Geoffrey S. Evans
Attorney, Agent, or Firm—Hardaway Law Firm, P.A.

[57] ABSTRACT

The method for laser-assisted image formation in transparent specimens consists in establishing a laser beam having different angular divergence values in two mutually square planes, followed by focusing the lase beam at a present point of the specimen. In the course of image formation the specimen is displaced with respect to the point of radiation focusing in order to change an angle between the plane with a maximum laser beam angualr divergence and the surface of the image portion being formed so as to suit the required contrast of the image portion involved.

3 Claims, 1 Drawing Sheet

METHOD FOR LASER-ASSISTED IMAGE FORMATION IN TRANSPARENT OBJECTS

TECHNICAL FIELD

The present invention relates to laser technology, more specifically to processing solid transparent materials such as glass, glass ceramics, transparent ceramics, and diamonds, with laser radiation.

BACKGROUND ART

Known in the prior art is a method for marking glass products by irradiating them with a focused laser beam having an intensity exceeding the glass destruction threshold (cf. RU #1,620,428, IPC C03C 27/12, 1989).

Another method for fancy patterning glass- and crystalware is known, wherein a pattern is made with a laser beam in an air medium at a temperature of from 223° to 253° K, and focusing a laser spot in the bulk of the object under process, spaced apart from the object outer surfaces a distance equal to at least 100 laser spot diameters (cf. RU #1,818,307, IPC C03C 33/00, 1990).

The closest to the proposed method as to its technical essence and attainable results is a method for laser-assisted formation of images in solid media by focusing laser radiation at a preset point of the object and displacing the latter with respect to laser beam in a predetermined manner. The object is irradiated with an energy density exceeding the threshold value of the volumetric disruptive strength of the material, and the objects is displaced in three mutually square directions (cf. RU #2,008,288, IPC C03C 23/00, 1991).

However, images produced by the aforementioned methods are of low contrast. Thus, in order to attain an adequate artistic expressiveness of an image it is necessary to substantially increase the power of laser radiation and the number of radiated pulses required for processing one object. These factors sophisticate much the equipment used for image formation and affects its service life.

DISCLOSURE OF THE INVENTION

It is a primary object of the present invention to provide a higher contrast of the image.

The foregoing object is accomplished due to the fact that prior to image formation a laser beam is established, featuring different angular divergence in two mutually square planes, and an angle between the plane with a maximum laser beam angular divergence and the surface of the image portion being formed is changed to suit the required contrast of said image portion.

It is common knowledge that divergence of laser radiation beam depends on the length of the laser resonator and the size of the aperture of the intraresontaor diaphragm. When a slit diaphragm is located inside the resonator it reduces laser beam divergence in the plane square with the diaphragm slit. Thus, while rotating the slit diaphragm about the resonator axis one can change the direction of the plane of maximum laser beam divergence. By focusing such a beam in the object under process one can obtain the region of maximum focusing (necking) whose transverse dimension 'd' can be evaluated from the following formula:

$$d = f$$

where f—focal length of focusing optics;

d—angle of divergence in the planes passing through the orthogonal axis X or Y (the Z axis being directed along the beam axis, the X axis being parallel to the diaphragm slit).

With the diaphragm fully out, the trace of destruction of the object material has approximately equal transverse dimensions along the X and Y axes, whereas with the diaphragm fully in, said trace features an extended length along the X axis, that is, the contrast of an image element depends on the orientation of the X axis. When forming an image one can orient said axis so as to suit the required image contrast.

The method for laser-assisted image formation in transparent objects disclosed herein is carried into effect as follows.

FIG. 1 represents a block diagram of carrying the method into effect, illustrating the following components:

1—laser emitter,
2—laser power unit,
3—intraresonator diaphragm,
4—diaphragm mechanical actuator,
5—focusing lens,
6—computer,
7—glass object,
8—three-dimensional machine tool,
9—drive of the three-dimensional machine tool.

Given below are some specific examples of carrying the method into effect.

EXAMPLE 1

An object made of grade K–8 glass and shaped as a parallepiped features a destruction threshold about 1010 W/sq.cm for a radiation wavelength of 1.06 micron. A pulsed laser beam is generated by the emitter 1 having the power unit 2, a pulse energy being 0.1 J and pulse duration, 10 ns. A laser radiation pulse having a divergence of 2.10–3 rad is focused in the object by an objective lens with a focal length of about 5.0 cm. The laser spot area in the focal plane is 10–3 sq.cm whence the radiation power density equals 1011 W/sq.cm, i.e., exceeds ten times the destruction threshold of the glass object under processing.

Upon inserting in the laser emitter the slit diaphragm 3 having a slit size from 1 to 4 mm, the laser spot gets narrowed in the focal plane towards the direction square with the diaphragm slit so as to acquire an oval shape.

A process for forming a pattern inside the glass object consists in spatial displacement of the object 7 with the aid of the three-dimensional machine tool 8 in a manner preset in the program of the computer 6, and starting the laser after each elementary displacement of the object 7. When executing the pattern the contrast of its individual areas is visually assessed and the required angle of turn of the diaphragm 3 is selected in the range of from 0° to 180° so as to provide the desired contrast. Afterwards the data on the angle of turn of the diaphragm are put in the computer program, whereby the diaphragm is turned automatically during displacement of the object.

EXAMPLE 2

A prism-shaped object from transparent sapphire is processed, the radiation energy being 0.05 J, laser pulse duration, 10 ns, pulsed radiation power, 0.5.107 W, laser beam divergence, 2.10–3 rad, objective lens focal distance, 25 mm. Otherwise the parameters of the device and an image forming process differ in nothing from that described in Example 1.

EXAMPLE 3

An object of a diamond intended for making jewelry therefrom and having one polished face undergoes processing according to the proposed method. The focal length of the objective lens is 10 mm. Otherwise the parameters of the device and an image forming process differ in nothing from that described in Example 2.

Industrial Applicability

Practical use of the herein-disclosed method for laser-assisted forming of images in transparent objects has made it possible to establish industrial-scale production of glass souvenirs with an interior stereoscopic picture.

We claim:

1. A method for laser-assisted image formation in transparent specimens, comprising:

establishing a laser beam having different angular divergence values in two mutually square planes;

focusing said laser beam at a preset point located in the bulk of said specimen until a radiation power density exceeding the object destruction threshold is obtained;

displacing said specimen with respect to said point of radiation focusing in a preset manner; and changing an angle between the plane with a maximum laser beam angular divergence and the surface of the image portion being formed so as to suit the required contrast of said image portion, performed during said displacement of said specimen.

2. The method according to claim 1 wherein said laser provides a continuous beam.

3. The method according to claim 1 wherein said laser provides a pulsed beam.

* * * * *